March 29, 1932.   A. R. SMITH   1,851,687

SYSTEM OF ELECTRICAL DISTRIBUTION

Filed Nov. 1, 1929

Inventor:
Arthur R. Smith,
by Charles E. Mullen
His Attorney.

Patented Mar. 29, 1932

1,851,687

UNITED STATES PATENT OFFICE

ARTHUR R. SMITH, OF SCHENECTADY, NEW YORK, ASSIGNOR TO GENERAL ELECTRIC COMPANY, A CORPORATION OF NEW YORK

SYSTEM OF ELECTRICAL DISTRIBUTION

Application filed November 1, 1929. Serial No. 404,151.

My invention relates to systems of electrical distribution and more particularly to busbar systems and systems of connections for central generating stations and sub-stations of distribution systems.

The ideal protection against short circuits on large generating stations consists in restricting the flow of current at any one part to a very low value. Owing to the fact that the present tendency in power generation is toward larger central stations with larger generating units, large amounts of power are concentrated on a single bus or bus section making the system susceptible to highly destructive phenomena upon the occasion of faults on the busbars or feeders unless suitable power limiting means are employed. Reactance coils or power limiting reactors have been used heretofore to sectionalize generating station busses so as to limit the current which can flow along the busbars from one side of the reactor to the other, and thereby limit the amount of current which would otherwise flow from all units connected to the bus into a fault on a given section. However, a reactance above a critical value between synchronous machines reduces the synchronizing power and may cause hunting between machines or complete loss of synchronism during faults or system disturbances. Hence, a need has arisen for a more effective system of reactoring and for utilizing the economy of very large generating units without the attendant disadvantages of high power concentration.

It is an object of my invention to provide a new and improved arrangement in electrical systems of distribution and busbar systems of central generating stations and substations for improving the power control and stability of systems of distribution.

Another object of my invention is to provide an improved system of connections in busbar systems in which the maximum number of small reactances may be introduced into the bus without resorting to a large number of small generating units and prime movers.

A further object of my invention is to provide a new and improved arrangement of generating units in a power station whereby single generating units may supply energy to a station bus at a number of different points so as to obtain a large number of supply points and thereby permit a large number of bus reactors normally introducing a minimum drop between generator windings and feeder connected to the bus, and under fault conditions introducing a large reactance between the sources of supply and the fault.

Figure 1:
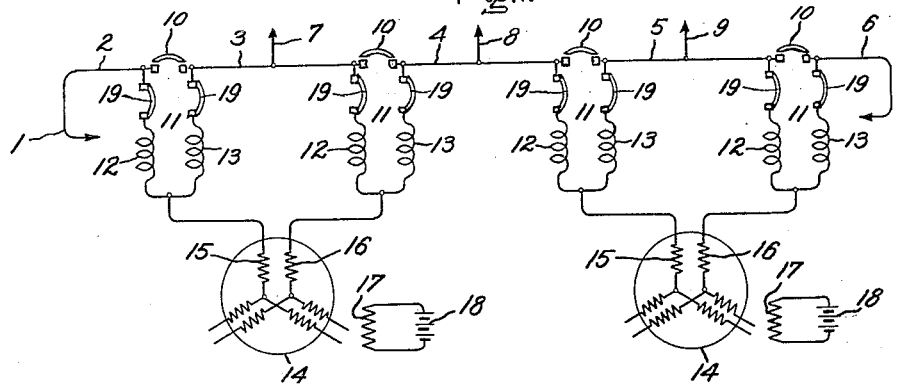
Figure 2:
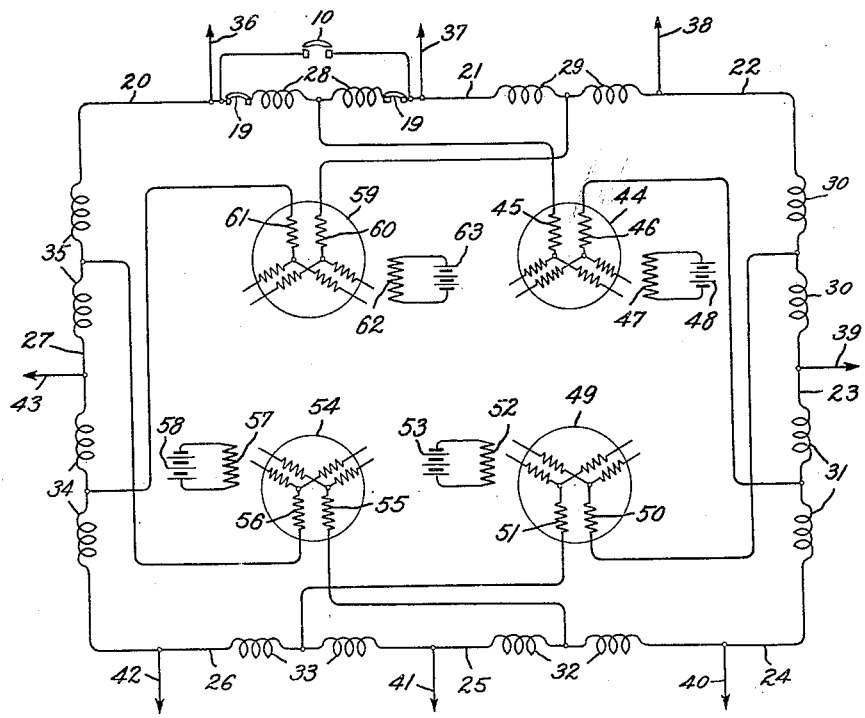

The novel features which I believe to be characteristic of my invention are set forth with particularity in the appended claims, the invention itself, however, both as to organization and method of operation together with further objects and advantages thereof will be better understood by reference to the following description taken in connection with the accompanying drawings in which Fig. 1 is a busbar arrangement embodying my invention, and Fig. 2 is a modification of the embodiment of my invention shown in Fig. 1.

Referring to Fig. 1 of the drawings, 1 indicates a portion of a power station bus which may be of the ring or chain type in a single or duplicate busbar system. For purposes of simplicity a one line diagrammatic representation has been used in this figure as well as in Fig. 2 to illustrate all of the circuits except the armature and field windings of the generators. The bus 1 may comprise any number of sections but for purposes of illustration I have shown only five sections designated as 2, 3, 4, 5 and 6. A large number of feeder circuits may be arranged to be supplied from each bus section and by way of example single feeder circuits 7, 8 and 9 are shown connected, respectively, to bus sections 3, 4 and 5. The bus sections have interposed therebetween suitable bus sectionalizing switches 10 which under the usual conditions of operation are maintained in a circuit interrupting position and are moved to a circuit closing position only when it is desirable to connect adjacent bus sections directly together. These switches are shown very diagrammatically and may be of any suitable type, such for example, as various types of oil switches well known in the art. Inductive means, illustrated as sectionalizing reactors 11, comprising windings sections 12 and 13 are connected between bus sections 2 and 3, 3 and 4, 4 and 5, and 5 and 6. The reactors 11 are of the differential or neutralizing type so that under normal conditions the winding sections 12 and 13 of the respective reactors will have equal currents flowing in both sections in opposite directions and under emergency conditions will have current flowing in both sections in series in the same direction. These reactors may be of the air core or iron core type.

In accordance with my invention multiple winding generators 14 having a plurality of separately insulated circuits are connected to energize the main bus in such a manner that each separately insulated circuit is connected to different neutralizing reactors. The alternating current generators 14 are diagrammatically illustrated as double winding generators although it will occur to those skilled in the art that more than two windings may be used without departing from my invention in its broader aspects. As shown each generator comprises two separately insulated stator windings 15 and 16, and an excitation winding 17 which is energized by a suitable source of current diagrammatically illustrated as a battery 18. The winding 15 of each generator is connected through the sections 12 and 13 of a differential reactor 11 to bus sections 2 and 3, respectively, and 4 and 5, respectively. Similarly the winding 16 of each generator is connected through the sections 12 and 13 of a differential reactor 11 to bus sections 3 and 4, respectively, and 5 and 6 respectively. A suitable switch 19 such as the usual type of oil switch is interposed between each section of a differential reactor and the bus section associated therewith, to interrupt the circuit through the reactor section and the generator winding associated therewith upon the occasion of a fault or short circuit, or to isolate the reactor section or sections and the generator winding or windings whenever it is found desirable or necessary.

There are several known arrangements of multiple windings for alternating current machines which may be utilized in carrying out my invention. One type consists of two complete and independent windings in the same stator slot with each winding having two coil sides in every slot. This is the type of winding generally used for multi-speed induction motors and is well known in the art. It is not the most suitable type of winding for two equally loaded circuits with symmetrical load characteristics on account of the slight difference in reactance between the two windings. Another type of winding which may be used is the standard multiple-circuit winding which is well known in the art and comprises, for example, two distinct circuits having alternate pole connected in series on each circuit. With a two pole machine, for example, instead of connecting the windings for each pole in parallel inside the machine, the terminals from each winding may be brought outside and connected to different bus sections. For a two pole machine this type of winding is not generally suitable on account of magnetic unbalance, but for the any number of poles greater than two this type of winding permits the machines to operate satisfactorily when the windings are connected to different bus sections. The reactance between windings is obviously very high on account of the great separation between corresponding phases of different circuits and where it is desirable and necessary to provide for exchange of current or shifting of load from different bus sections through the generator as well as through the reactor it is necessary to use a type of winding which has a reasonably low reactance between the separate windings. A type of winding which is particularly suitable for these latter conditions is one in which two complete windings are arranged in alternate slots in the stator core as described and claimed in United States Letters Patent No. 1,815,832, granted July 21, 1931, upon an application of Delmar D. Chase, and assigned to the same assignee of the present application. This winding consists of two separate circuits with the conductors of corresponding phase belts of different circuits distributed in alternate slots around the complete periphery of the stator core. Because the voltages in the two circuits under one pole are out of phase by an angle corresponding to the slot pitch it is usually desirable to alternate the circuits which are leading under adjacent poles in order to obtain equal and in-phase voltages between the terminals of the respective windings.

With the arrangement shown in Fig. 1 the effective reactance between bus sections will be practically neutralized for an equal distribution of feeder load whereas current flowing to a fault beyond a given reactor from an adjacent bus section and remote bus sections will have to pass through both sections of the reactors in series. This greatly increases the effective reactance in the bus to the flow of fault current. At the same time with the multiple winding generator it becomes practicable to utilize large generating units, with the attendant economical advantages and the additional operating advantage of having a greater number of points of energy supply for the bus without increasing the number of generating units. Furthermore the sub-division of power supply from a given generator unit permits the use of circuit breakers having a lower ampere capacity and at the same time reduces the interrupting capacity of the circuit breakers for a given capacity of generatings units. To introduce reactances directly in the bus renders difficult the supply of energy to given groups of feeders when one of the generator units is idle. Accordingly, a switch 10 permits by-passing the reactors of an idle machine while switches 19 permit the disconnection of the reactors and generator from the bus in case of trouble in the reactor or generator.

In Fig. 2 of the drawings I have shown a modification of the embodiment of my invention shown in Fig. 1 wherein a number of multiple-winding generators having separate windings in the same machine are arranged to supply energy to remote points in a ring bus comprising bus sections 20, 21, 22, 23, 24, 25, 26, and 27. Between each bus section I interpose a differential reactor which in each instance may be provided with switches 19 between each section of the reactor and the bus section interconnected thereby and with a switch 10 between adjacent bus sections as shown in Fig. 1, but for purposes of simplicity in illustration only one reactor is shown arranged in this manner while the remainder are directly connected between bus sections. As shown reactors 28, 29, 30, 31, 32, 34 and 35 are connected between bus sections 20 and 21, 21 and 22, 22 and 23, 24 and 25, 25 and 26, 26 and 27, and 27 and 28, respectively. Any suitable number of feeder circuits may be arranged to be supplied from each bus section and by way of example single feeder circuits 36, 37, 38, 39, 40, 41, 42 and 43 are connected to bus sections 20, 21, 22, 23, 24, 25, 26 and 27, respectively. Multiple-winding generators having a plurality of separately insulated circuits are connected to energize the main bus in such a manner that each separately insulated circuit is connected to different and remote neutralizing reactors. As shown, an alternating current generator 44 is diagrammatically illustrated as having two separately insulated stator windings 45 and 46 and an excitation winding 47 which is energized by a suitable source of current diagrammatically illustrated as a battery 48. The generator winding 45 is connected to the electrical mid-point of reactor 28 and thereby is arranged to supply current to bus sections 20 and 21 respectively. The generator winding 46, however, is connected to the electrical mid-point of the reactor 31 and is therefore arranged to supply current to bus sections 23 and 24, respectively. It will be observed that bus section 23 is separated from bus section 21 by reactors 29 and 30. Another double winding generator 49 comprising two separately insulated windings 50 and 51 and an excitation winding 52 energized by a source of excitation 53 is connected to the main bus so that winding 50 supplies energy to the bus sections 22 and 23 through reactor 30, and winding 51 supplies energy to the bus sections 25 and 26 through the reactor 33. In a similar manner the double-winding generator 54 comprising two separately insulated windings 55 and 56 and an excitation winding 57 having a source of excitation 58, is connected to the main bus so that winding 55 supplies energy to the bus sections 25 and 24 through the reactor 32, and winding 56 supplies energy to the bus sections 20 and 27 through the reactor 35. The remaining source of supply for the bus is the double-winding generator 59 comprising two separately insulated windings 60 and 61 and an excitation winding 62 having a source of excitation 63. The generator winding 60 is connected to the main bus through reactor 29 to supply energy to the bus sections 21 and 22, and the generator winding 61 is connected to the main bus through the reactor 34 to supply energy to the bus sections 27 and 26.

In the arrangement shown in Fig. 2 it will be observed that I have provided a plurality of multiple-wound generators having the separately insulated windings of each generator connected to different points in the bus providing thereby a large number of points of supply and permitting a large number of reactors in the bus with a minimum reactance drop between a given generator winding and a given feeder under normal conditions of operation and an adequate reactance drop under abnormal conditions to limit the flow of energy to a point of fault to a safe value.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, a main bus comprising a plurality of bus sections, inductive means interposed between each of said bus sections, and a plurality of dynamo-electric machines each being provided with a plurality of separately insulated windings of corresponding time-phase voltages each connected respectively to a plurality of different sections of said bus, through said inductive means.

2. In combination, a main bus comprising a plurality of bus sections, reactors connected between said bus sections, and a plurality of dynamo-electric machines each being provided with a plurality of separately insulated windings connected respectively to the electrical mid-point of different reactors.

3. In a system of distribution, a main bus comprising a plurality of sections, distribution circuits connected to bus sections, a normally open switch connected between adjacent bus sections, a reactor connected in parallel relation with each of said switches and comprising two sections arranged so that the effective reactance between bus sections under a predetermined condition of operation in the system is substantially neutralized, a plurality of dynamo-electric machines each being provided with a plurality of separately insulated windings connected respectively to a point between different reactors, and switches between each reactor and bus section associated therewith.

4. In a system of distribution, a main bus comprising a plurality of sections, feeder circuits connected to said bus sections, reactors for interconnecting bus sections and each comprising two winding sections arranged when traversed by equal currents in opposite directions through the respective sections thereof to have the total reactive drop across each reactor substantially zero, and a plurality of synchronous dynamo-electric machines each comprising a plurality of separately insulated windings connected to said main bus so that the separately insulated windings of a given machine are connected between sections of reactors interconnecting bus sections in a manner to include a plurality of reactors in a circuit through the main bus to the respective points of connection of the separately insulated windings of a given machine.

5. In a system of distribution, a main bus comprising a plurality of sections, feeder circuits connected to be energized from said bus sections, differential reactors for interconnecting adjacent bus sections, and a plurality of synchronous dynamo-electric machines each comprising two separately insulated windings connected respectively to differential reactors interconnecting non-adjacent bus sections.

In witness whereof, I have hereunto set my hand this 31st day of October, 1929.

ARTHUR R. SMITH.